Nov. 20, 1928.                                                          1,692,227
                              J. C. SEGELER
                       SHOCK ABSORBER AND THE LIKE
                          Filed March 7, 1927
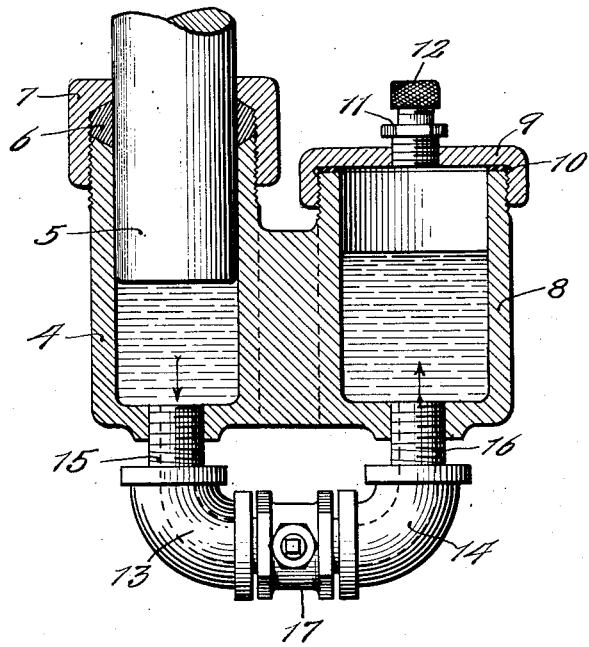

Patented Nov. 20, 1928.

1,692,227

UNITED STATES PATENT OFFICE.

JOHN C. SEGELER, OF CHICAGO, ILLINOIS.

SHOCK ABSORBER AND THE LIKE.

Application filed March 7, 1927. Serial No. 173,385.

The present invention has to do with improvements in shock absorbers and the like. The device herein disclosed is intended primarily for use in connection with automotive vehicles and for similar purposes, but the features of the invention are not limited to the foregoing or any other particular usefulness. Nevertheless, it will be understood that the present device has been devised and constructed to meet the particular requirements of such uses.

The shock absorber herein disclosed is of a hydraulic type, that is, the type in which there are provided suitable co-operating elements such as a plunger and cylinder, one element being attached to one portion of the vehicle and the other element to another portion thereof so that the elements are compelled to move with respect to each other as the spring is compressed or allowed to extend. Between these elements is placed oil or other suitable liquid, such as a mixture including glycerin and alcohol, which liquid is displaced back and forth.

In conjunction with the foregoing I provide a sealed chamber having in its upper portion an air pocket, said chamber being directly connected with the cylinder by a proper passageway, so that the liquid will be displaced back and forth between the cylinder and the chamber as the plunger moves in the cylinder. The amount of liquid displaced into the chamber will be sufficient to compress the air to a condition of sufficient pressure to establish the necessary static balance; and as the force exerted between the plunger and cylinder elements changes the liquid will be displaced back and forth, the air in the pocket establishing the desired cushioning effect.

Furthermore, suitable valve mechanism is placed between the cylinder and chamber so as to create a snubbing action or so as to dampen the transfer of liquid and thereby dampen the vibrations.

One of the objects of the invention is to provide a device which can be readily used at any convenient part of the chassis structure. For example, this device can be located directly between the chassis frame and the axle, or between the end of the spring and the other device to which said end is ordinarily connected. Or, again, the device may be used between the two companion parts of a double elliptic spring so as to give a shock absorbing action at that point, as well as making available the shock absorbing qualities of the spring itself.

Another object of the invention is to provide a very simple structure, one which can be very cheaply manufactured from few parts, and one which will not get out of order in service.

Other objects and uses will appear from a detailed description of the invention, which consists in the features of construction and combinations of parts hereinafter described and claimed.

In the drawing:—

The figure shows a vertical section through one form of device embodying the features of the present invention.

The device illustrated in the figure includes a cylinder 4 within which there works a plunger 5. Preferably, the plunger is packed by a suitable packing gland 6, which can be tightened up by a packing cap 7 in accordance with well understood principles. The cylinder 4 and plunger 5 are intended to be connected to the two parts between which the movement is performed. For example, the cylinder may be attached to the axle and the plunger to the chassis frame.

Adjacent to the position of the cylinder 4 is a chamber 8, the upper end of which is closed in any convenient manner, as, for exaxple, by means of a cap 9. Such cap when used should be provided with a washer or gasket 10 in order to insure a thoroughly airtight seal.

If desired, a nipple 11 may be connected into the cap 9 so as to allow compressed air to be introduced into the chamber 8, after which said nipple may be closed in air-tight fashion by means of a cap 12. Such nipple if used is preferably provided with an internal check valve which will allow the air to be forced into the chamber 8 but will prevent the air from leaking out except when intended by the operator.

A suitable liquid passage connects the bottom portion of the cylinder 4 with the bottom portion of the chamber 8. In the construction illustrated this takes the form of suitable fittings 13 and 14, together with nipples 15 and 16, and a valve 17 is also shown as located in said passage. Said valve may be used to either partially or completely shut off the passage, but, of course, ordinarily the valve will be only partially closed or will be left fully open in order to allow a free circulation of liquid back and forth.

When the vehicle is in a static condition the plunger 5 will be forced down into the cylinder a sufficient distance to displace such an amount of liquid into the chamber 8 as will compress the air therein to the necessary pressure to exactly balance the load carried by the plunger, taking account of the cross-sectional area of the plunger. The parts should be so proportioned, and the amount of air in the chamber 8 should be so adjusted, that under its normal load the piston will occupy a suitable position within the cylinder 4, for example, about half way down in the cylinder. It will be understood that this condition also has reference to the valve 17 being open to a greater or less extent so as to permit transfer of liquid therethrough.

The shock-absorbing action will be due to the fact that as the load between the plunger 5 and cylinder 4 increases or decreases the plunger will be either forced into the cylinder or allowed to move out therefrom a greater or less distance, but at all times the liquid will flow back and forth due to the presence of the compressed-air pocket. By closing the valve 17 to whatever extent is desired the action can be retarded so as to produce a snubbing effect. This is due to the fact that any interchange of liquid must be through the valve 17 as the same is located in the only passage between the chambers 4 and 8.

While I have herein shown and described only certain embodiments of the features of my present invention, still I do not intend to limit myself thereto except as I may do so in the claim.

I claim:

A shock absorber for the purpose specified comprising, in combination, a cylinder, a piston working therein, a closed chamber, a single passage connecting the lower portion of the cylinder with the lower portion of said chamber, oil occupying the space within the cylinder beneath the piston and also the single passage aforesaid and the lower portion of the chamber, there being an air pocket in the upper portion of the chamber, and a control valve in the single passage aforesaid between the cylinder and chamber, substantially as and for the purpose described.

JOHN C. SEGELER.